(12) United States Patent
Mizikovsky et al.

(10) Patent No.: US 9,986,420 B2
(45) Date of Patent: May 29, 2018

(54) VALIDATING CELL ACCESS MODE

(71) Applicant: Alcatel-Lucent USA Inc., Murray Hill, NJ (US)

(72) Inventors: Semyon Mizikovsky, Morganville, NJ (US); Suresh P Nair, Whippany, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 193 days.

(21) Appl. No.: 14/790,228

(22) Filed: Jul. 2, 2015

(65) Prior Publication Data

US 2016/0014826 A1  Jan. 14, 2016

Related U.S. Application Data

(60) Provisional application No. 62/022,196, filed on Jul. 8, 2014.

(51) Int. Cl.
| | |
|---|---|
| *H04W 76/02* | (2009.01) |
| *H04W 4/08* | (2009.01) |
| *H04W 8/18* | (2009.01) |
| *H04W 48/16* | (2009.01) |
| *H04W 12/10* | (2009.01) |
| *H04W 24/02* | (2009.01) |
| *H04L 29/06* | (2006.01) |
| *H04W 12/12* | (2009.01) |
| *H04W 84/04* | (2009.01) |

(52) U.S. Cl.
CPC .......... *H04W 8/186* (2013.01); *H04L 63/123* (2013.01); *H04W 4/08* (2013.01); *H04W 12/10* (2013.01); *H04W 12/12* (2013.01); *H04W 24/02* (2013.01); *H04W 48/16* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 9,066,268 B2* | 6/2015 | Huang | H04W 36/0055 |
| 2010/0238858 A1* | 9/2010 | Kim | H04W 4/08 370/328 |
| 2010/0278147 A1* | 11/2010 | Horn | H04W 36/08 370/331 |

(Continued)

*Primary Examiner* — Charles C Jiang
*Assistant Examiner* — George Atkins, Jr.
(74) *Attorney, Agent, or Firm* — Davidson Sheehan LLP

(57) ABSTRACT

An example method includes receiving at a User Equipment (UE) a value for an Access Mode identifier and a value for a Closed Subscriber Group (CSG) identifier in one or more cell advertisements, selecting a cell based on the or more cell advertisements, and reporting in a message the value of the Access Mode identifier and the value CSG identifier for the cell advertisement of the cell selected. A core network element receives a first Access Mode identifier value and a first CSG identifier value, these first values associated with a cell advertisement of a cell selected by a UE; receives a second Access Mode identifier value and a second CSG identifier value, these second values reported by the cell selected by the UE; performs a comparison of first and second Access Mode identifier value and/or first and second CSG identifier values; and takes action based on the comparison.

20 Claims, 4 Drawing Sheets

(56) References Cited

U.S. PATENT DOCUMENTS

| | | | | |
|---|---|---|---|---|
| 2012/0122422 A1* | 5/2012 | Olsson | ............... | H04L 12/4633 |
| | | | | 455/410 |
| 2013/0322389 A1* | 12/2013 | Maeda | ................... | H04L 5/001 |
| | | | | 370/329 |
| 2014/0113637 A1* | 4/2014 | Guan | ................... | H04W 8/082 |
| | | | | 455/437 |
| 2014/0341124 A1* | 11/2014 | Ronneke | ............... | H04W 76/02 |
| | | | | 370/329 |

* cited by examiner

VALIDATING CELL ACCESS MODE

This application claims the benefit of provisional application 62/022,196, filed Jul. 8, 2014.

FIELD OF THE INVENTION

The invention is related to the field of communication systems and, in particular, to preventing detrimental attacks on restricted communications carried through maliciously modified cells in a communication system.

BACKGROUND

In addition to deploying traditional commercial Radio Access Networks (e.g., Macro, Micro, Pico, Metro Cells) which are under tight operational control, wireless operators have also been distributing the Home-use small cells called Home NodeB (HNB for Third Generation (3G) Universal Terrestrial Radio Access Network (UTRAN)) and Home eNodeB (HeNB for 4G enhanced UTRAN/Long Term Evolution (eUTRAN/LTE). 3G networks implemented by service providers include Universal Mobile Telecommunications System (UMTS) networks, Enhanced Voice Data Optimized (EV-DO) networks, General Packet Radio Service (GPRS) networks, etc. 4G networks include Long Term Evolution (LTE) network and other Packet-Switched (PS) networks.

As opposed to traditional commercial Radio Access Networks which have limited/tight operational access which limits end-user proximity, end-users are much more easily able to gain operational access to H(e)NB cells (where H(e)NB refers to both HNB or HeNB). These H(e)NB cells are distributed to end-users for improved in-house radio coverage, as well as for restricted service provided to authorized mobile devices. In contrast, typically only service personal with appropriate credentials and/or service equipment have the right or ability to a facility holding traditional commercial RAN network equipment.

H(e)NB are typically configured in one of three different Access Modes: 'Open' for unrestricted access by any mobile devices (User Equipments (UEs)): 'Closed' for restricted access by select UEs belonging to a Closed Subscriber Group (CSG): and 'Hybrid' for unrestricted access by any mobile devices (UEs) but providing preferential treatment to select UEs belonging to a Closed Subscriber Group (CSG). The H(e)NB advertises the supported Access Mode by broadcasting a 'mode' information as well as the CSG for 'Closed' and 'Hybrid' mode. This information concerning the supported Access Mode is evaluated by UEs while selecting the access network (e.g., Radio Access Network (RAN)) for service.

UEs can be configured for restricted or preferential access to RAN resources (e.g., cell or H(e)NB) that advertise particular supported CSG in addition to or instead of accessing any available Open resource. For example, the UE of a user can be configured to select a particular H(e)NB with specific CSG when at home, and to select any available RAN resource when outside the home. An Enterprise UE can be configured to access only selected Cells or H(e)NBs that advertise the Enterprise-specific CSG, and to avoid access to other RAN resources.

In the Core Network (CN), the access restriction is enforced by verifying that provisioned Cell or H(e)NB configuration (i.e., Access Mode, CSG) logged in CN databases corresponds to the configuration reported by the Cell or H(e)NB during the initial Registration or Resource allocation. In addition, the CN verifies that the UE accessing the 'Closed' Cell or H(e)NB indeed belongs to the CSG associated with the Cell or H(e)NB.

In this manner, service providers are able to offer numerous voice and data services to end users of mobile devices such as voice calls, call forwarding, call waiting, Internet access, streaming audio, streaming video, online gaming, Internet Protocol television (IP-TV), etc. Once authenticated to the network a mobile device is able to receive requested and authorized services.

SUMMARY

Given that H(e)NBs are deployed in insecure environments such as private homes, small enterprises, etc., there is a possibility that H(e)NBs may be maliciously modified to alter the advertised Access Mode, and thus allow attacks (e.g., 'Man-in-the-Middle" attacks) on critical user information and wireless system integrity.

Of a particular interest is the attack scenario in which the maliciously modified cell (e.g., LTE HeNB) is configured by the CN to operate in Open mode, but is configured to advertise its mode on the radio interface as Closed restricted to a specific targeted CSG. The performance of such advertising is undertaken by the attacker to attract to maliciously modified cell (e.g., LTE HeNB) unsuspecting UEs configured for restricted access only on particular cells that advertise this restricted CSG.

For example, the restricted CSG would be advertised by the hacked HeNB on the radio interface, while the HeNB would report itself as 'Open' to the CN and would be. Access from the UE through this HeNB would be granted as the HeNB would be verified by the CN to be 'Open' for all mobiles; security context would be duly distributed from the CN (e.g., from the Mobility Management Entity (MME)) to the HeNB; and, the Attacker would be able to completely eavesdrop of secure UE communications.

Embodiments provided herein enable the prevention of detrimental attacks on restricted communications carried though maliciously modified cells in a communication system. Various elements of the CN (e.g., HeNB-Gateway (HeNB-GW), Mobility Management Entity (MME) and the like) are able to thwart a potential attack by comparing the Access Mode Identifier (ID) and CSG Identifier (ID) seen by the UE over the air advertisement from a cell (e.g., HeNB) with the Access Mode ID and CSG ID reported by the cell (e.g., HeNB) to the CN and by taking action accordingly based on the comparison. If there is a data mismatch between IDs in the air advertisement and the IDs reported by the cell, corrective action can be undertaken (e.g., disallowing the attach of the UE, denying service to the cell (e.g., HeNB), and the like). An example UE according to the principles of the invention is configured to forward to the CN the Access Mode and CSG ID seen by the UE over the air advertisement from a cell (e.g., HeNB), in order for the CN to thwart a potential attack.

In one embodiment, a method at a User Equipment (UE) includes receiving a value for an Access Mode identifier and a value for a Closed Subscriber Group (CSG) identifier in one or more cell advertisements, selecting a cell based on the one or more cell advertisements, and reporting in a message the value of the Access Mode identifier and the value of the CSG identifier for the cell advertisement of the cell selected.

In one embodiment, the cell is a Home NodeB or Home eNodeB. In one embodiment, the message is a Non Access Stratum (NAS) message. In one embodiment, reporting in the message includes forwarding a Non Access Stratum (NAS) message to a core network element via a Home NodeB or Home eNodeB. The core network element may be a H(e)NB-GW or MME.

In another embodiment, an apparatus includes a processor and an associated memory. The processor is configured to receive a value for an Access Mode identifier and a value for a Closed Subscriber Group (CSG) identifier in one or more cell advertisements, to select a cell based on the one or more cell advertisements, and to report in a message the value of the Access Mode identifier and the value of the CSG identifier for the cell advertisement of the cell selected.

In one embodiment, the processor is configured to receive the one or more cell advertisements from a Home NodeB or Home eNodeB. In one embodiment, the processor is configured report the value of the Access Mode identifier and the value CSG identifier for the cell advertisement of the cell selected in a Non Access Stratum (NAS) message. In one embodiment, the processor is configured to forward the value of the Access Mode identifier and the value CSG identifier for the cell advertisement of the cell selected a Non Access Stratum (NAS) message toward a core network element via a Home NodeB or Home eNodeB. The core network element may be a H(e)NB-GW, MME or the like.

In another embodiment, a method at a core network element includes receiving a first Access Mode identifier value and a first Closed Subscriber Group (CSG) identifier value, the first Access Mode identifier value and the first CSG identifier value associated with a cell advertisement of a cell selected by a User Equipment (UE); receiving a second Access Mode identifier value and a second CSG identifier value, the second Access Mode identifier value and the second CSG identifier value reported by the cell selected by the UE; performing a comparison of at least one of the group consisting of the first Access Mode identifier value to the second Access Mode identifier value and the first CSG identifier value to the second CSG identifier value; and taking action based on the comparison.

In one embodiment, taking action based on the comparison includes, when the first Access Mode identifier value is not equivalent to the second Access Mode identifier value or the first CSG identifier value is not equivalent to the second CSG identifier value, at least one of the group consisting of disallowing attach to the core network and denying service to the cell.

In one embodiment, taking action based on the comparison includes, when the first Access Mode identifier value is equivalent to the second Access Mode identifier value and the first CSG identifier value is equivalent to the second CSG identifier value, at least one of the group consisting of permitting attach to the core network and permitting service to the cell.

In one embodiment, the second Access Mode identifier value and the second CSG identifier value are received in a message that includes the first Access Mode identifier value and the first CSG identifier value in a Non Access Stratum (NAS) capsule, the second Access Mode identifier value and the second CSG identifier value being outside the NAS capsule.

In one embodiment, the method includes receiving at the core network element a Closed Subscriber Group (CSG) identifier value from a first cell, retrieving from a configuration database an authorized operation mode for the first cell, verifying at the core network element that the CSG identifier value received from the first cell is authorized, and when verified as authorized, instructing initialization of the operation mode of the first cell.

In another embodiment, an apparatus includes a processor configured to receive a first Access Mode identifier value and a first Closed Subscriber Group (CSG) identifier value, the first Access Mode identifier value and the first CSG identifier value associated with a cell advertisement of a cell selected by a User Equipment (UE); to receive a second Access Mode identifier value and a second CSG identifier value, the second Access Mode identifier value and the second CSG identifier value reported by the cell selected by the UE; to perform a comparison of at least one of the group consisting of the first Access Mode identifier value to the second Access Mode identifier value and the first CSG identifier value to the second CSG identifier value; and to take action based on the comparison.

In one embodiment, the processor is configured to, when the first Access Mode identifier value is not equivalent to the second Access Mode identifier value or the first CSG identifier value is not equivalent to the second CSG identifier value, at least one of the group consisting of disallow attach to the core network and deny service to the cell.

In one embodiment, the processor is configured to, when the first Access Mode identifier value is equivalent to the second Access Mode identifier value and the first CSG identifier value is equivalent to the second CSG identifier value, at least one of the group consisting of permit attach to the core network and permit service to the cell.

In one embodiment, the processor is configured to receive the second Access Mode identifier value and the second CSG identifier value in a message that includes the first Access Mode identifier value and the first CSG identifier value in a Non Access Stratum (NAS) capsule, the second Access Mode identifier value and the second CSG identifier value being outside the NAS capsule.

In one embodiment, the processor is configured to receive a Closed Subscriber Group (CSG) identifier value from a first cell, retrieve from a configuration database an authorized operation mode for the first cell, verify that the CSG identifier value received from the first cell is authorized, and when verified as authorized, instruct initialization of an operation mode of the first cell.

In one embodiment, the apparatus is a core network element, a Home eNodeB-Gateway (HeNB-GW), Home NodeB-Gateway (HNB-GW), or a Mobility Management Entity (MME).

Other exemplary embodiments may be described below.

Although the threat described scenario and the embodiments proposed to address this threat are applicable to all cells, such as Small cells, Femto cells, Pico Cells, or Microcells using different wireless technologies (e.g., 3G UMTS or 4G LTE), the danger particularly arises in the context of home-based LTE Femto cells, such as HeNB.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Various embodiments described herein provide for the comparison of the Access Mode ID and CSG ID seen by a UE over the air advertisement from the HeNB with the Access Mode ID and CSG ID reported by the HeNB to the CN in order to prevent malicious attack (e.g., Man-in-the-Middle attack). If the Access Mode and CSG ID from both sources do not match, corrective action, such as disallowing the attach of the UE, denying service to the HeNB, etc., can be undertaken. The invention will be primarily described within the context of a UE in communication with a HeNB and CN. However, it will be appreciated that the invention is also applicable to radio communication systems' cells and the like and suitable for use in various other arrangements which are also contemplated by the inventors as benefiting from the invention.

Figure 1:
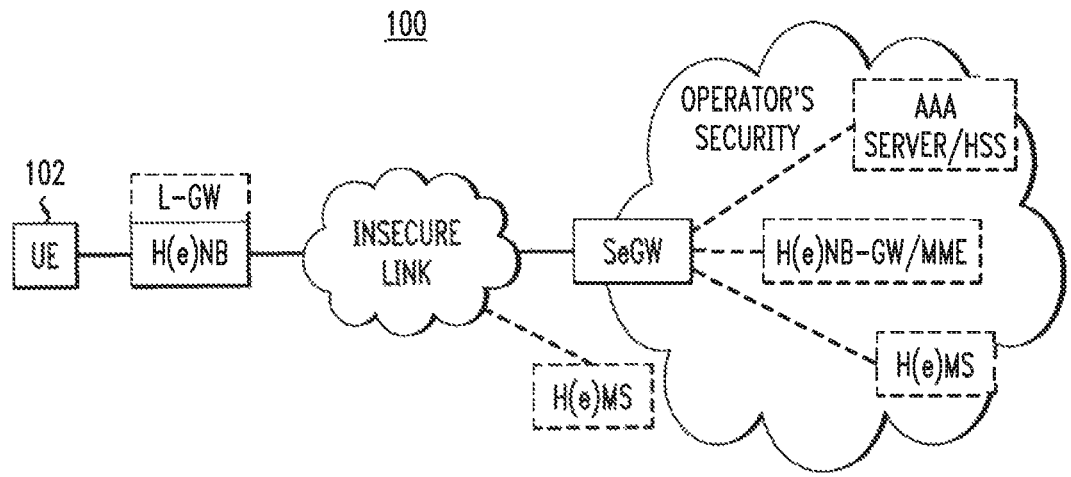
FIG. 1 illustrates a high-level block diagram of a communication system benefitting from one or more exemplary embodiment described herein.

FIG. 1 depicts a high-level block diagram of a system benefiting from one or more embodiments. Generally speaking, the system 100 of FIG. 1 contemplates one or more user equipment (UE) (only one shown) illustratively capable of accessing a mobile network via Home NodeB (HeNB). The mobile network may comprise a 3G/4G mobile network such as a 3GPP network, such as a Third Generation network, for example a Universal Terrestrial Radio Access Network (UTRAN), or a Fourth Generation network, for example a Long-Term Evolution (LTE) network and so on. Various embodiments provide a mechanism whereby the Access Mode and CSG ID seen by a UE over the air advertisement from the H(e)NB is compared with that reported by the H(e)NB to the CN in order to decide further action.

User Equipment (UE) is a user equipment for UMTS (for HNB) or LTE (for HeNB). UE 102 is a mobile device, such as a mobile phone, a computer, a tablet, etc. and may also be referred to as a subscriber or user and the like. UE 102 is able to access a Packet Switched (PS) core network through an H(e)NB.

The H(e)NB is a network element that connects User Equipment via its radio interface to the operator's core network. The backhaul link to the operator's network is a broadband connection. A H(e)NB is typically deployed in customers' premises. Note that the term H(e)NB refers to both Home NodeB (HNB) and Home eNodeB (HeNB).

Optional Local Gateway (L-GW) may be utilized as a gateway for a plurality of H(e)NB.

The SeGW is a network element at the border of a security domain of the operator. If a H(e)NB-GW is deployed the SeGW is located in front of the H(e)NB-GW, else it is located at the edge of the core network. H(e)NB may be linked to SeGW via an insecure link. After successful mutual authentication between the H(e)NB and the SeGW, the SeGW connects the H(e)NB to the operator's security domain. Any connection between the H(e)NB and the H(e)NB-GW or core network is tunneled through the SeGW.

The H(e)MS is a management server that configures the H(e)NB according to the operator's policy. H(e)MS is also capable of installing software updates on the H(e)NB. The H(e)MS server may be located inside the operator's access or core network (accessible on the MNO Intranet) or outside of it (accessible on the public Internet).

HSS stores the subscription data and authentication information of the H(e)NBs. When hosting party authentication is required, AAA server authenticates the hosting party based on the authentication information retrieved from HSS.

H(e)NB-GW/MME refers to a core network element that is one of a H(e)NB-GW or a MME. The H(e)NB-GW/MME makes access decision regarding the UE and whether it will be permitted access to the operators security domain.

Various other network elements (not shown) may be deployed in the illustrative network to support control plane and/or data plane operations. The above and other details are know to one skilled in the art and documented by 3GPP TS 33.320 which is herein incorporated by reference.

Generally speaking, UE 102 communicates with a H(e)NB to receive mobile services thereby via the operators security domain.

Figure 2:
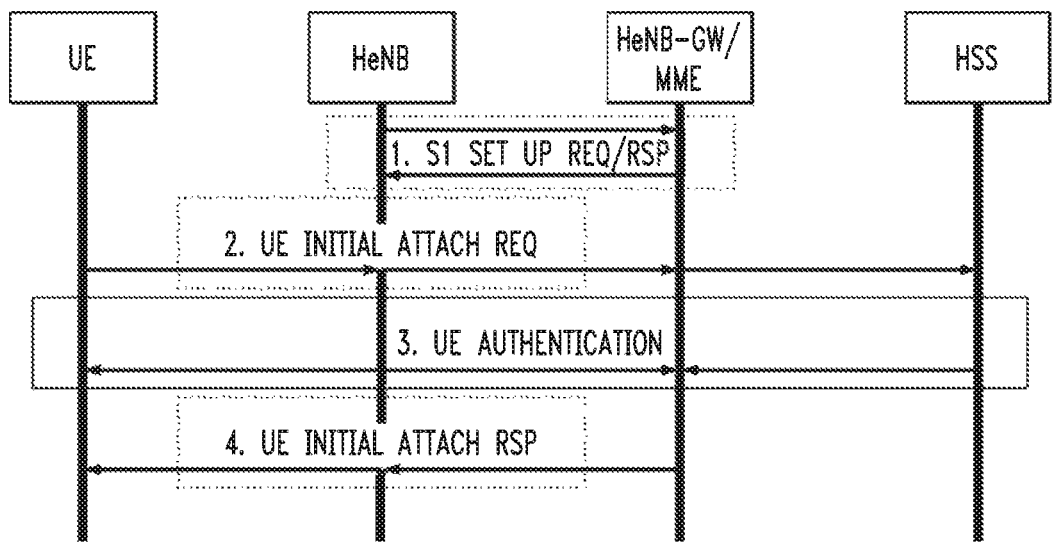
FIG. 2 is a call flow diagram illustrating conventional HeNB registration and initial UE attach procedure.

FIG. 2 is a call flow diagram illustrating conventional HeNB registration and initial UE attach procedure.

1. Upon power up and once initial transport connection is established to the CN, the HeNB executes the S1 establishment transaction with the MME (S1 Set Up Request/Response). During this transaction the HeNB and MME activate the control interface S1 between them.
2. Once the UE selects the HeNB for service it sends the Attach Request which triggers the UE Authentication Procedure.
3. UE Authentication is executed between the MME and UE using Authentication Vector provided by the HSS.
4. Once Authentication is completed, the Attach Response is executed and UE is attached.

Figure 3:
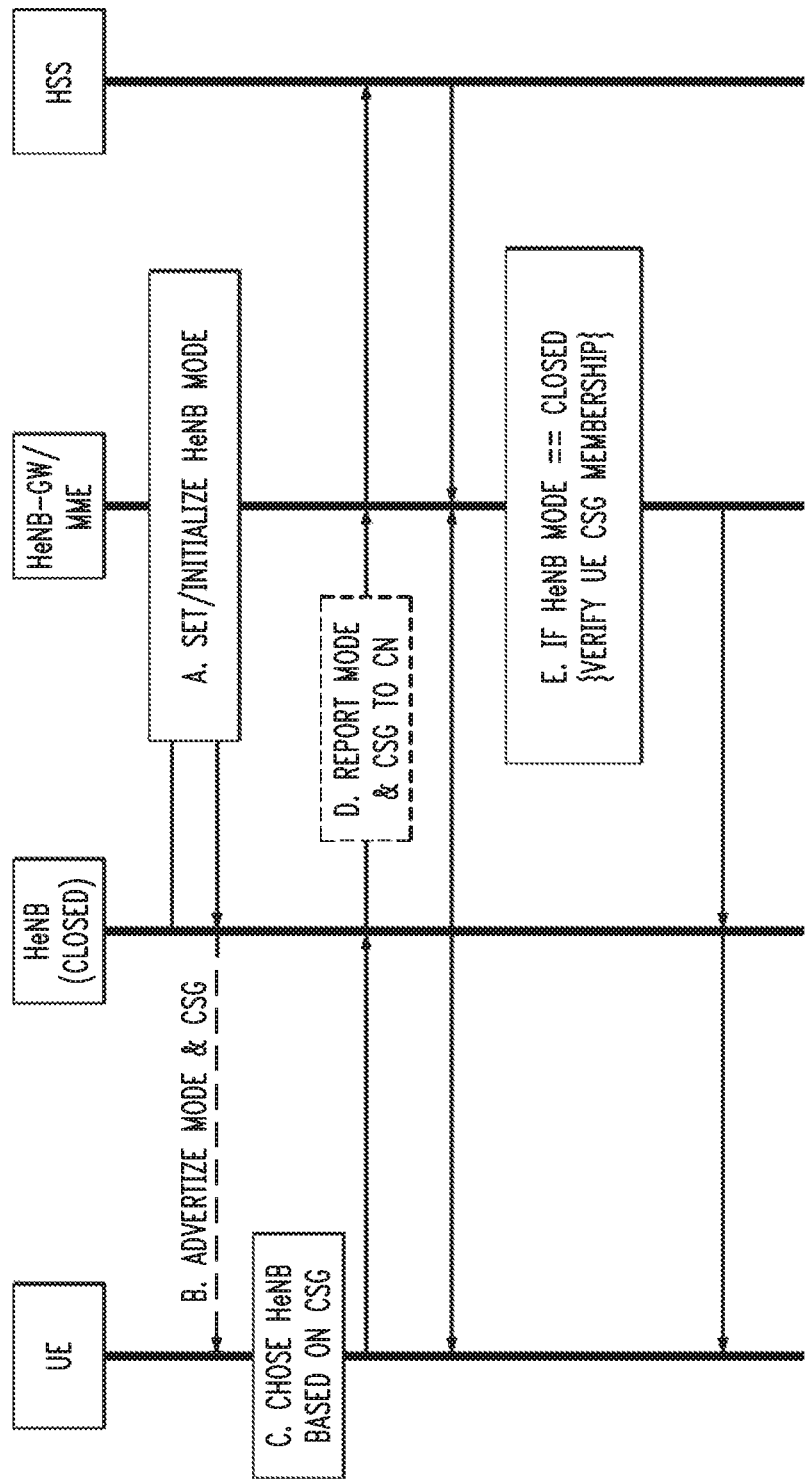
FIG. 3 is a call flow diagram illustrating conventional verification of HeNB Access Mode and CSG Authorization for a UE.

FIG. 3 is a call flow diagram illustrating conventional verification of HeNB Access Mode and CSG Authorization for a UE.

A. During the S1 Set Up phase the HeNB reports its CSG (if any); HeNB-GW/MME retrieves from the local configuration database the authorized operation mode for the HeNB, and verifies that the CSG reported by the HeNB is authorized.
B. HeNB is placed into service and begins advertising its Access Mode and CSG on the Broadcast radio channel
C. The UE chooses the HeNB based on CSG and Mode advertized, using its own preconfigured access preferences.
D. HeNB piggybacks its Access Mode and CSG information on the Non-Access Stratum (NAS) message (Attach Request) transported to the HeNB-GW/MME.
E. As a part of UE Authentication transaction, the HSS delivers the list of CSGs authorized for the UE. Upon completion of UE Authentication, the MME verifies that UE is authorized to use the CSG reported by the Closed Mode HeNB. This check does not apply to Open and Hybrid HeNBs, as any UE can access them. If UE does not belong to a CSG membership, its access to the Closed HeNB is denied.

It is clear from the described process that the maliciously modified HeNB can report one Access Mode and CSG presence or absence in the process A during the initialization as well as in the process D during UE connection, and advertize completely different configuration, Access Mode, and CSG in the process B over the radio broadcast, thus allowing the attack.

A proposed solution to thwart the attack is for the CN (MME) to compare the Access Mode and CSG ID seen by the UE over the air advertisement from the HeNB with the Access Mode and CSG ID reported by the HeNB to the CN.

Advantageously, upon successful UE authentication, the secure Non Access Stratum (NAS) control link is established directly between UE and the CN (MME) which traverses the HeNB unprocessed. The HeNB cannot manipulate NAS messages as they are integrity protected end-to-end from UE to MME.

It is also suggested that when sending the NAS Attach Request the UE also includes in the protected NAS capsule the Access Mode and CSG ID received from the HeNB Advertisement.

Upon receiving the NAS message, the MME will compare the Access Mode and CSG ID received from the UE in the protected NAS message payload with those separately reported by the HeNB itself, in an S1 message but outside the NAS payload, during the S1 establishment and verification according to the current 3GPP standard TS 33.320 Sec.4.4.9.

If match is discovered, the MME rests assured that HeNB behaves properly, and continues normal service for HeNB.

However, in case of a mismatch the MME disallows the UE attachment and raises suspicion about the HeNB operation. Assumption is that the UE may also be a culprit of attack, and report a wrong Access Mode and CSG ID received over the air, while HeNB operates properly. But if mismatch continues for multiple mobiles, the MME will disallow the HeNB operation as being a suspect of malicious modification.

As the result, the attack will be thwarted.

Figure 4:
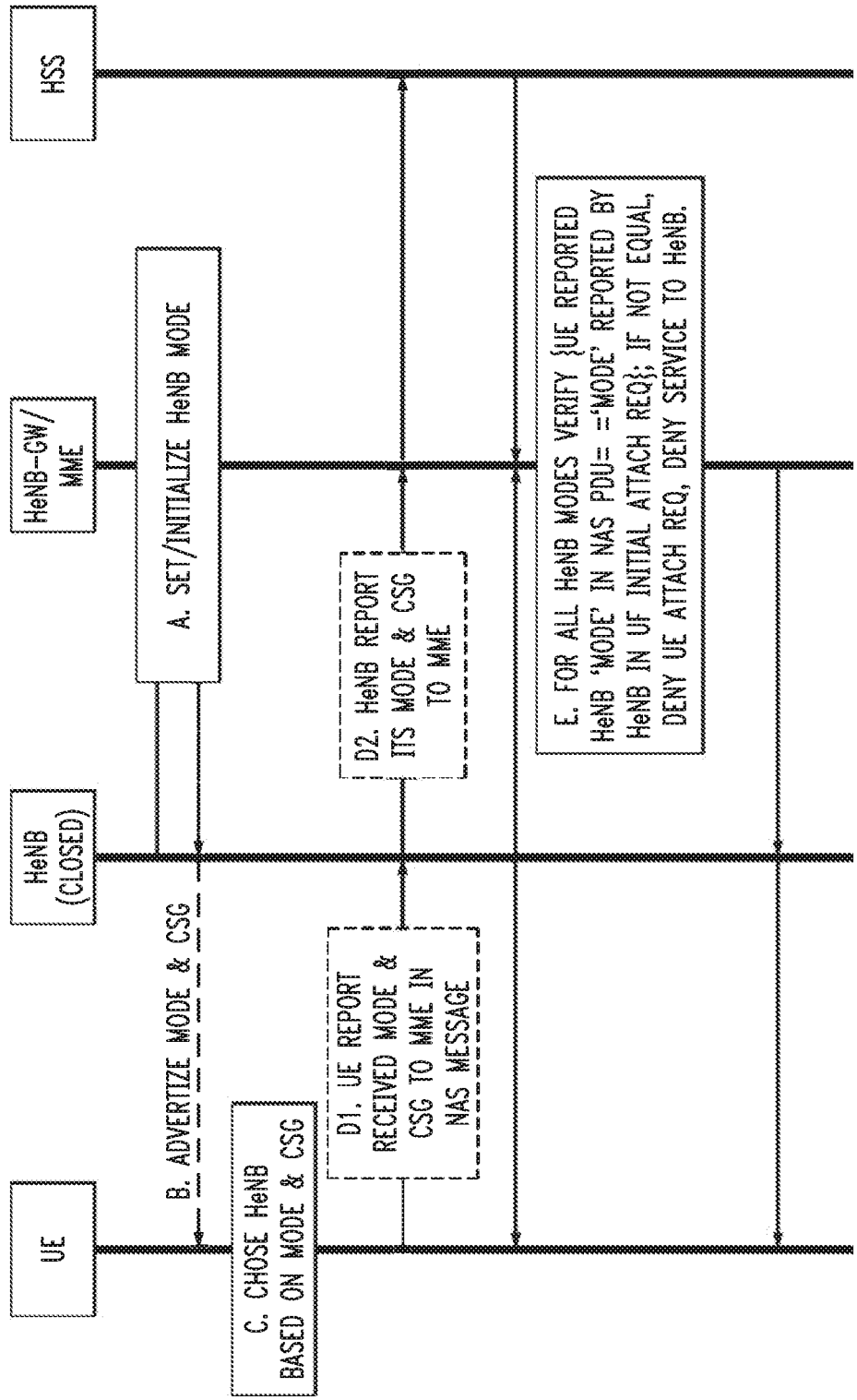
FIG. 4 is an example call flow diagram illustrating verification of HeNB Access Mode and CSG Authorization for a UE according to one embodiment implementing the principles of the invention.

FIG. 4 is an example call flow diagram illustrating verification of HeNB Access Mode and CSG Authorization for a UE according to one embodiment implementing the principles of the invention.

Steps A, B, and C are as conventionally performed, see FIG. 3.

A. During the S1 Set Up phase the HeNB reports its CSG (if any); HeNB-GW/MME retrieves from the local configuration database the authorized operation mode for the HeNB, and verifies that the CSG reported by the HeNB is authorized.

B. HeNB is placed into service and begins advertising its Access Mode and CSG on the Broadcast radio channel.

C. The UE chooses the HeNB based on CSG and Mode advertized, using its own preconfigured access preferences.

In Step D1 the UE includes the Access Mode and CSG values as they are received from the HeNB advertisement. These values are included in the Integrity protected NAS message.

In Step D2 the HeNB conventionally reports its Access Mode and CSG by attaching these values outside the NAS capsule.

In Step E the MME compares the Access Mode and CSG reported by the UE with those reported by the HeNB, and if mismatch is determined—takes the corrective action by disallowing the Attach, or even denying service to the HeNB.

Described Attack can potentially be recognized by mapping the HeNB ID to the provisioned list of Cell IDs which are authorized to serve the restricted UEs. But this list would be very difficult to scale and manage for each and every restricted UE, in particular when standardized Access Control applies to only verifiably Closed HeNBs.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Figure 5:
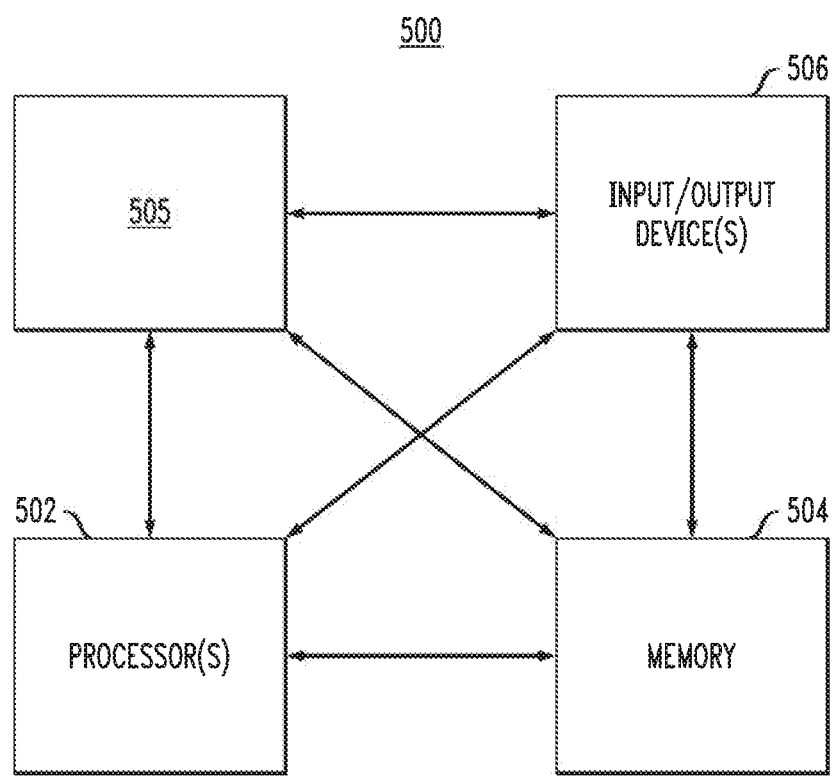
FIG. 5 depicts a high-level block diagram of a general purpose computing device suitable for use in various embodiments.

FIG. 5 depicts a high-level block diagram of a computing device, such as a processor in a telecom network element, suitable for use in performing functions described herein such as those associated with the various elements described herein with respect to the figures.

As depicted in FIG. 5, computing device 500 includes a processor element 502 (e.g., a central processing unit (CPU) and/or other suitable processor(s)), a memory 504 (e.g., random access memory (RAM), read only memory (ROM), and the like), cooperating module/process 505, and various input/output devices 506 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

In the case of a routing or switching device such as UE, H(e)NB-GW, MME, H(e)NB, SeGW, AAA Server, HSS, H(e)MS and the like, the cooperating module process 505 may implement various switching devices, routing devices, interface devices and so on as known to those skilled in the art. Thus, the computing device 500 is implemented within the context of such a routing or switching device (or within the context of one or more modules or sub-elements of such a device), further functions appropriate to that routing or switching device are also contemplated and these further functions are in communication with or otherwise associated with the processor 502, input-output devices 506 and memory 504 of the computing device 500 described herein.

It will be appreciated that the functions depicted and described herein may be implemented in hardware and/or in a combination of software and hardware, e.g., using a general purpose computer, one or more application specific integrated circuits (ASIC), and/or any other hardware equivalents. In one embodiment, the cooperating process 505 can be loaded into memory 504 and executed by processor 503 to implement the functions as discussed herein. Thus, cooperating process 505 (including associated data structures) can be stored on a computer readable storage medium, e.g., RAM memory, magnetic or optical drive or diskette, and the like.

It will be appreciated that computing device 500 depicted in FIG. 5 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

Various embodiments contemplate an apparatus including a processor and memory, where the processor is configured to determine a value for a summation of load contribution from one or more UEs, the load contribution for respective ones of the one or more UEs based on a minimum grant for the respective ones of the one or more UEs; and manage at least one radio resource based on the value of the summation, and generally perform the functions described above with respect to the managing of a radio resource such as deciding a TTI size, PDU size and so on. The processor is configured to perform the various functions as described, as well communicate with other entities/apparatus including respective processors and memories to exchange control plane and data plane information in accordance of the various embodiments.

Although various embodiments which incorporate the teachings of the invention have been shown and described in detail herein, those skilled in the art can readily devise many other varied embodiments that still incorporate these teachings. Thus, while the foregoing is directed to various embodiments of the invention, other and further embodiments of the invention may be devised without departing from the basic scope thereof. As such, the appropriate scope of the invention is to be determined according to the claims.

The invention claimed is:

1. A method comprising:
   receiving, at a User Equipment (UE), a value for an Access Mode identifier and a value for a Closed Subscriber Group (CSG) identifier in one or more cell advertisements;
   selecting, at the UE, a cell based on the one or more cell advertisements;
   reporting in a message to a core network element, by the UE, the value of the Access Mode identifier and the value of the CSG identifier for the cell advertisement of the cell selected, and
   selectively attaching the UE to the cell in response to the value of the Access Mode identifier and the value of the CSG identifier for the cell advertisement of the cell selected being the same as a value of an Access Mode identifier and a value of a CSG identifier provided to the core network element by the cell.

2. The method of claim 1 wherein the cell is a Home NodeB or Home eNodeB.

3. The method of claim 1 wherein the message is a Non Access Stratum (NAS) message.

4. The method of claim 1 wherein the reporting in a message comprises:
   forwarding a Non Access Stratum (NAS) message to the core network element via a Home NodeB or Home eNodeB.

5. An apparatus comprising:
   a processor and an associated memory, the processor configured to
   receive a value for an Access Mode identifier and a value for a Closed Subscriber Group (CSG) identifier in one or more cell advertisements;
   select a cell based on the one or more cell advertisements;
   report in a message to a core network element the value of the Access Mode identifier and the value of the CSG identifier for the cell advertisement of the cell selected; and
   selectively attach the UE to the cell in response to the value of the Access Mode identifier and the value of the CSG identifier for the cell advertisement of the cell selected being the same as a value of an Access Mode identifier and a value of a CSG identifier provided to the core network element by the cell.

6. The apparatus of claim 5 wherein the processor is configured to receive the one or more cell advertisements from a Home NodeB or Home eNodeB.

7. The method of claim 5 wherein the processor is configured report the value of the Access Mode identifier and the value CSG identifier for the cell advertisement of the cell selected in a Non Access Stratum (NAS) message.

8. The method of claim 5 wherein the processor is configured to forward the value of the Access Mode identifier and the value CSG identifier for the cell advertisement of the cell selected in a Non Access Stratum (NAS) message toward the core network element via a Home NodeB or Home eNodeB.

9. A method comprising:
   receiving, at a core network element from a User Equipment (UE), a first Access Mode identifier value and a first Closed Subscriber Group (CSG) identifier value, the first Access Mode identifier value and the first CSG identifier value being received by the UE in a cell advertisement of a cell selected by the UE
   receiving, at the core network element, a second Access Mode identifier value and a second CSG identifier value, the second Access Mode identifier value and the second CSG identifier value reported to the core network element by the cell selected by the UE;
   performing a comparison of, at the core network element, at least one of the group consisting of the first Access Mode identifier value to the second Access Mode identifier value and the first CSG identifier value to the second CSG identifier value; and
   taking action based on the comparison.

10. The method of claim 9 wherein taking action based on the comparison comprises:
when the first Access Mode identifier value is not equivalent to the second Access Mode identifier value or the first CSG identifier value is not equivalent to the second CSG identifier value, at least one of the group consisting of disallowing attach to the core network and denying service to the cell.

11. The method of claim 9 wherein taking action based on the comparison comprises:
when the first Access Mode identifier value is equivalent to the second Access Mode identifier value and the first CSG identifier value is equivalent to the second CSG identifier value, at least one of the group consisting of permitting attach to the core network and permitting service to the cell.

12. The method of claim 9 wherein the second Access Mode identifier value and the second CSG identifier value are received in a message that includes the first Access Mode identifier value and the first CSG identifier value in a Non Access Stratum (NAS) capsule, the second Access Mode identifier value and the second CSG identifier value being outside the NAS capsule.

13. The method of claim 9 further comprising:
receiving at the core network element a Closed Subscriber Group (CSG) identifier value from a first cell;
at the core network element, retrieving from a configuration database an authorized operation mode for the first cell;
verifying at the core network element that the CSG identifier value received from the first cell is authorized; and
when verified as authorized, instructing by the core network element initialization of the operation mode of the first cell.

14. An apparatus comprising:
a core network element comprising a processor configured to
receive a first Access Mode identifier value and a first Closed Subscriber Group (CSG) identifier value from a User Equipment (UE), the first Access Mode identifier value and the first CSG identifier value being received by the UE in a cell advertisement of a cell selected by the UE;
receive a second Access Mode identifier value and a second CSG identifier value, the second Access Mode identifier value and the second CSG identifier value reported to the core network element by the cell selected by the UE;
perform a comparison of at least one of the group consisting of the first Access Mode identifier value to the second Access Mode identifier value and the first CSG identifier value to the second CSG identifier value; and
take action based on the comparison.

15. The apparatus of claim 14 wherein the processor is configured to:
when the first Access Mode identifier value is not equivalent to the second Access Mode identifier value or the first CSG identifier value is not equivalent to the second CSG identifier value, at least one of the group consisting of disallow attach to the core network and deny service to the cell.

16. The apparatus of claim 14 wherein the processor is configured to:
when the first Access Mode identifier value is equivalent to the second Access Mode identifier value and the first CSG identifier value is equivalent to the second CSG identifier value, at least one of the group consisting of permit attach to the core network and permit service to the cell.

17. The apparatus of claim 14 wherein the processor is configured to:
receive the second Access Mode identifier value and the second CSG identifier value in a message that includes the first Access Mode identifier value and the first CSG identifier value in a Non Access Stratum (NAS) capsule, second Access Mode identifier value and the second CSG identifier value being outside the NAS capsule.

18. The apparatus of claim 14 wherein the processor is configured to:
receive a Closed Subscriber Group (CSG) identifier value from a first cell;
retrieve from a configuration database an authorized operation mode for the first cell;
verify that the CSG identifier value received from the first cell is authorized; and
when verified as authorized, instruct initialization of a cell mode of the first cell.

19. The apparatus of claim 14 wherein the apparatus is a Home eNodeB Gateway (HeNB-GW), Home NodeB Gateway, or a Mobility Management Entity (MME).

20. The method of claim 9,
wherein receiving, at the core network element, the first Access Mode identifier value and the first Closed Subscriber Group (CSG) identifier value comprises receiving the first Access Mode identifier value and the first CSG identifier value associated with the cell advertisement of a cell first selected by a User Equipment (UE); and
wherein receiving, at the core network element, the second Access Mode identifier value and the second CSG identifier value comprises receiving the second Access Mode identifier value and the second CSG identifier value reported by the first cell selected by the UE.

* * * * *